(12) United States Patent  
Whitney et al.

(10) Patent No.: US 8,602,790 B1  
(45) Date of Patent: Dec. 10, 2013

(54) DEMONSTRATION TOOLS FOR GEOMETRIC PROPERTIES

(75) Inventors: Glen T Whitney, Stony Brook, NY (US); George Hart, Stony Brook, NY (US); Cindy Lawrence, Port Jefferson Station, NY (US); Timothy Nissen, New York, NY (US); Chenteh Kenneth Fan, Cambridge, MA (US)

(73) Assignee: Museum of Mathematics, New York, NY (US)

( * ) Notice: Subject to any disclaimer, the term of this patent is extended or adjusted under 35 U.S.C. 154(b) by 610 days.

(21) Appl. No.: 12/793,677

(22) Filed: Jun. 4, 2010

(51) Int. Cl.
*G09B 23/02* (2006.01)

(52) U.S. Cl.
USPC .......................................................... 434/211

(58) Field of Classification Search
USPC ................. 434/188, 208, 211, 215, 200, 303; 446/219; 362/124, 326, 341, 342
See application file for complete search history.

(56) References Cited

U.S. PATENT DOCUMENTS

| | | | | |
|---|---|---|---|---|
| 1,521,339 A | * | 12/1924 | Taylor | 434/303 |
| 2,529,107 A | * | 11/1950 | Shapiro | 434/303 |
| 3,486,243 A | * | 12/1969 | Rive | 434/303 |
| 3,962,802 A | * | 6/1976 | Kane | 434/303 |
| 4,135,096 A | * | 1/1979 | Giordano | 378/14 |
| 5,108,293 A | * | 4/1992 | Stack et al. | 434/303 |
| 5,396,333 A | * | 3/1995 | Aleshin et al. | 356/601 |
| 7,597,059 B2 | * | 10/2009 | Stutznacker | 112/475.08 |
| 7,976,175 B2 | * | 7/2011 | Schulz | 362/11 |
| 2004/0137189 A1 | * | 7/2004 | Tellini et al. | 428/64.4 |
| 2010/0213392 A1 | * | 8/2010 | Hatzav et al. | 250/492.1 |

OTHER PUBLICATIONS

"Geometry Junkyard: Seventeen Proofs of Euler's Formula", Jun. 14, 2004 [retrieved online Dec. 24, 2012].*
"The Geomblog: Planar Graphs and Steinit's Theorem", Aug. 30, 2006 [retrieved online Dec. 24, 2012].*
Techniquest catalog, www.techniquest.org/business/content/pdf.html?h=Exhibits%20%3E%20Maths%20&file=pdfs/Exhibits/Themes/MathsTheme.pdf, 16 pp, describing exhibits at science museum in Cardiff Wales.

* cited by examiner

*Primary Examiner* — Kurt Fernstrom
(74) *Attorney, Agent, or Firm* — Withrow & Terranova, PLLC; Taylor M. Davenport

(57) ABSTRACT

A variety of tools for demonstrating the mathematical properties is disclosed. In one embodiment, a demonstrator uses the tools to illuminate geometric relationships between objects in two and three-dimensional space. The tools may be a stationary exhibit or collected into a portable kit. Whether portable or stationary, the tools provide an easy to use, multifunctional, and visually captivating vehicle for demonstration of geometric properties.

13 Claims, 19 Drawing Sheets

US 8,602,790 B1

DEMONSTRATION TOOLS FOR GEOMETRIC PROPERTIES

FIELD OF THE DISCLOSURE

The present disclosure is directed to tools for demonstrating certain properties of mathematical shapes, including cross-sections of geometric objects.

DETAILED DESCRIPTION

Mathematics is often underappreciated for its ubiquity, beauty, and capacity to entertain, especially amongst children. By demonstrating mathematics in an entertaining manner, understanding, and appreciation of the field may improve. The present disclosure provides a variety of tools for demonstrating the mathematical properties of physical objects, and particularly illustrates various cross-sectional views that may be made with a variety of geometric objects. In an exemplary embodiment, a laser is used in conjunction with a translucent object to illuminate a cross-section of the translucent object. In a first embodiment, the laser is positioned in fixed, stationary position and the objects are introduced into the light projected by the laser. In a second embodiment, the laser is a portable laser, and, together with the objects, may be assembled into a portable kit. The orientation of the object may be varied relative to a plane of light created by the laser to illustrate various cross-sectional slices.

Figure 1:
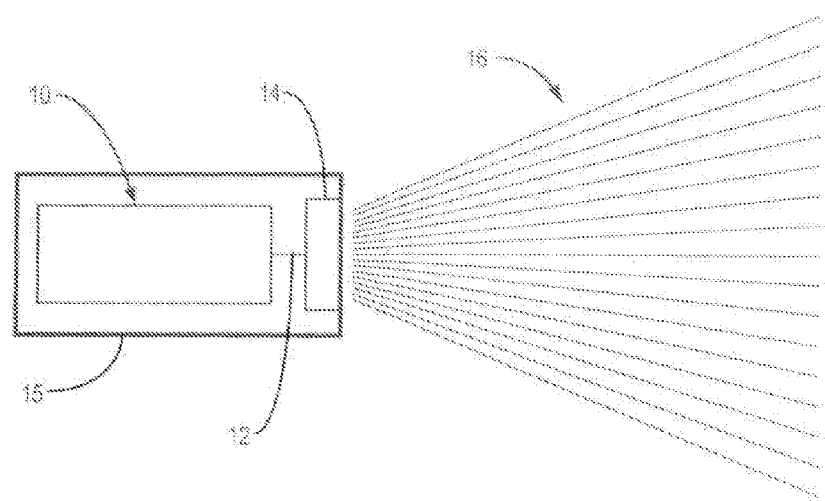
FIG. 1 illustrates an embodiment of an illumination device suitable for use with the present disclosure.

The tools of the present disclosure start with an illumination device 10, illustrated in FIG. 1, which in an exemplary embodiment is a laser. The illumination device 10 emits a light in a line 12 that strikes a lens 14, which transforms the light of line 12 into a plane of light 16. The laser may be enclosed is a small housing. In a particularly contemplated embodiment, the illumination device 10 and lens 14 are sold as a single unit in a preformed housing, such as the 635 nm Compact 88° Line Laser Module Diode Module as distributed by Photonic Products of Hertfordshire, UK (a copy of the data sheet can be found at www.photonic-products.com/products/laser_diode_modules/compact/635nm_compact_88line.pdf and is hereby incorporated by reference). At 635 nm, the laser emits a red light that is visible to the human eye in both dark environs as well as reasonably well lit environs. The housing of the Photonic Products laser is approximately 8 mm in diameter and approximately 29 mm in length in a generally cylindrical housing. In some embodiments, a power source may be provided for the illumination device such as a transformer coupled to a standards AC wall plug or a battery pack. In an exemplary embodiment, the laser and lens 14 are contained within a housing 15. Alternatively, the lens 14 may be affixed to the casing of the laser. In still another embodiment, the lens 14 and the laser are held by separate mounts, but held in a fixed relative position to one another (e.g., two mounts attached to a single rigid support member).

Figure 2:
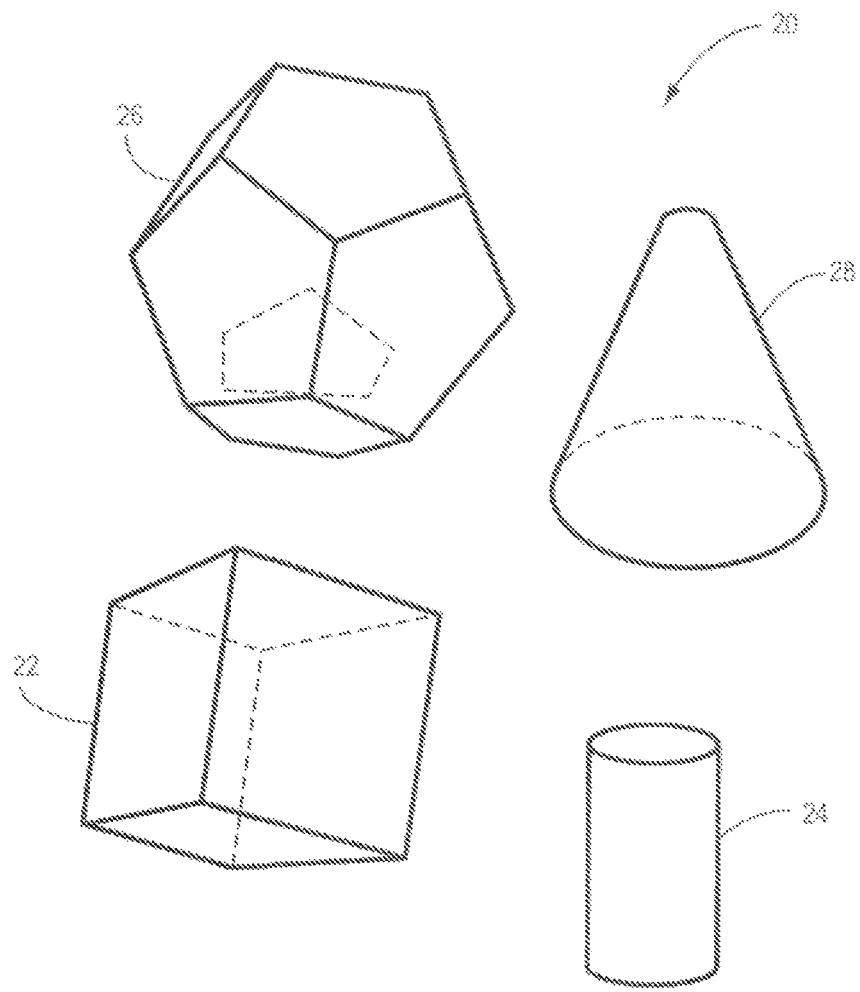
FIG. 2 illustrates objects that may be used with the illumination device of FIG. 1 in some embodiments of the present disclosure.

The second part of the tools is in the three-dimensional objects with which the illumination device 10 interacts. Together the illumination device 10 and the three-dimensional objects form a system that effectively illustrates cross-sectional properties of the objects. The illustration of cross-sectional properties may be used as a prop or exhibit by teachers to educate one or more individuals about mathematics in the form of geometric shapes in an innovative and exciting manner. Some of the objects 20 are illustrated in FIG. 2. In particular, the objects 20 may be geometric shapes such as a cube 22, a cylinder 24, a dodecahedron 26, and a cone 28. Other regular shapes such as a tetrahedron, an octahedron, an icosahedron, or the like may also be used although they are not illustrated. Likewise, irregular shapes (e.g., pyramids with a square base, trapezoidal shapes, or the like) may also be used if desired.

In use, one or more objects 20 are introduced into the plane of light 16. The plane of light 16 passes through the object 20, effectively "slicing" the object 20 and creating a virtual cross-section of the object 20. Where the plane of light 16 intersects the object 20, the light scatters and/or reflects so as to highlight the cross-section that is being created. As used herein, the term "virtual cross-section" refers to the cross-section that is visibly created in the object without actually having to cut the object. Thus, in contrast to some teaching aids where that have physical cuts in the object to reveal the cross-section, the present disclosure reflects that the object remains intact, but the cross-section is, revealed through the use of the laser light.

To achieve the scattering and reflection, the objects 20 are translucent, such that a readily visibly discernable amount of light may pass from the illumination device 10 through the entirety of a given object 20. If the material used to make the objects 20 is too opaque, light throughput may suffer to the point that the plane originating on one side of the object 10 does not reach the opposite side. Conversely, if too transparent, the scattering and reflection effect created when the plane of light intersects with the object 20 may be less discernable than desired. In one embodiment, the objects 20 are constructed from a transparent acrylic plastic and airbrushed with a light coat of white latex paint spray, such that when the paint is dry, the plastic reaches a desirable level of translucence. Alternately, a semi-transparent or translucent polypropylene thermoplastic may be used at the outset, eschewing the spraying step. In short, the material of the object has enough opacity to reflect some of the light from the illumination device 10, but transparent enough to allow the light to reach the other side.

In one embodiment, an object 20 may be formed from a plurality of plastic sections that are assembled using an adhesive. For example, an assembly process may begin with a flat sheet of plastic. A router may be used to cut the sheet into smaller pieces, which may then be assembled into a three-dimensional object 20. For example, pentagonal sides of a dodecahedron may be cut from a sheet, such that all twelve sides may then be affixed together with commercial-grade adhesive. In another embodiment, two or more adjacent sides of a three-dimensional object may be cut as a single piece from the sheet. The intended intersection of the sides may be scored and the flat piece may be heated to a point of pliability before folding the intersections to create two or more sides of the three-dimensional object. For example, the six sides of a cube may be formed from a cross or t-shape and folded into a cube. In another embodiment, an entire object may be constructed at once using an injection mold and a translucent polypropylene thermoplastic polymer or similar material. In yet other embodiments, the three-dimensional objects may be made of other translucent materials, such as frosted glass.

Figure 3:
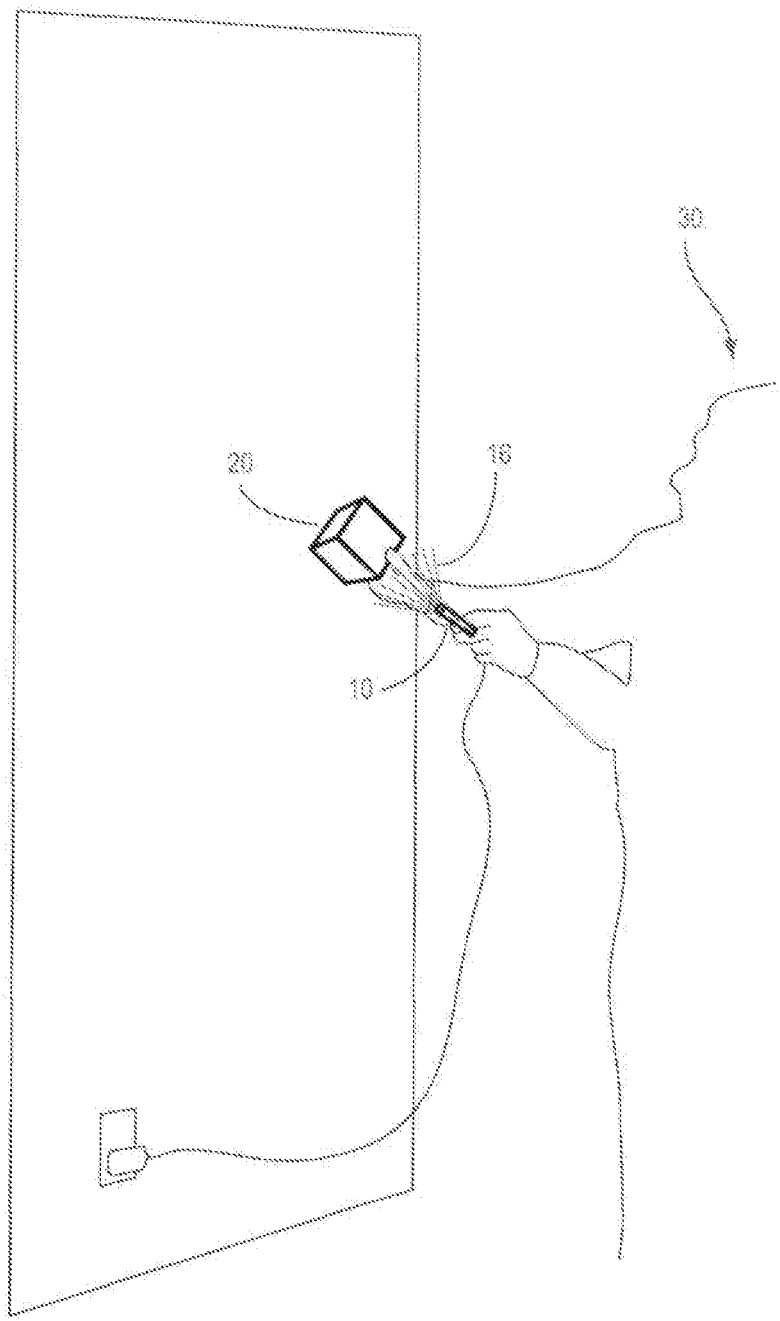
FIG. 3 illustrates an exemplary embodiment of a system of the present disclosure in use by a demonstrator.
Figure 4:
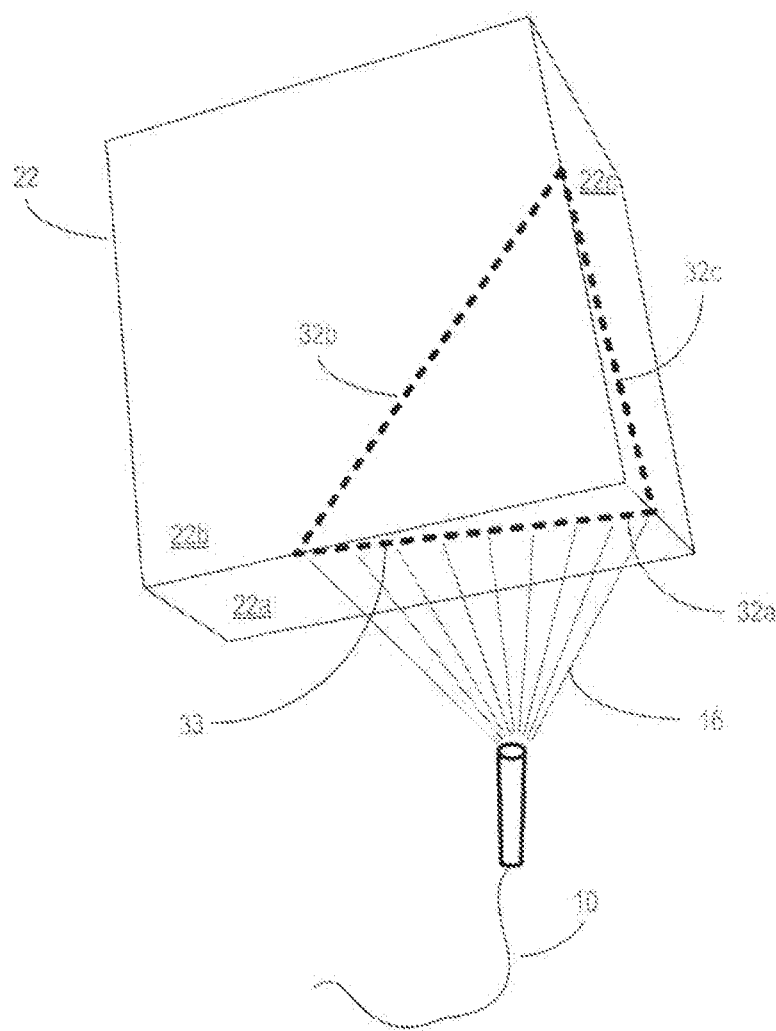
FIG. 4 illustrates a first geometric shape capable of being presented using the system of the present disclosure.

Together, the illumination device 10 and the objects 20 may be used to illustrate mathematical properties of the objects 20. In a simple embodiment, a single illumination device 10 may be used with an object 20 as better illustrated in FIGS. 3 and 4. As illustrated, a demonstrator 30 may hold the illumination device 10 (or a housing or wand containing the illumination device 10) in one hand and an object 20 in a second hand. The demonstrator 30 points the illumination device 10 at the object 20. The plane of light 16 is incident on the object 20 and thereby creates a virtual cross-section, and the translucent nature of the object 20 means that the light reflects and scatters at the lines of intersection such that an observer sees the virtual cross-section. For example, as better illustrated in FIG. 4, the plane of light 16 strikes three surfaces of the cube 22, particularly sides 22a, 22b, and 22c. This arrangement causes light to reflect along line segments 32a, 32b, and 32c respectively, forming a two-dimensional triangle 33.

Figure 5:
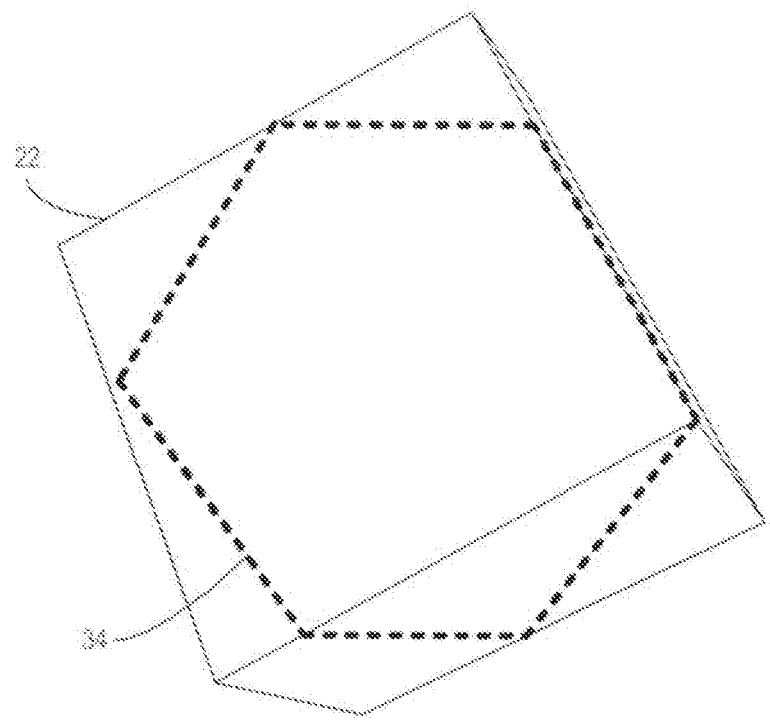
FIG. 5 illustrates a second geometric shape capable of being presented using the system of the present disclosure.
Figure 5:
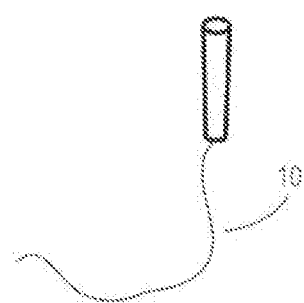

Given a particular object 20, and control over the relative orientations of the object 22, the demonstrator may create and highlight different cross-sections through the object 20. Thus, for example, a cube 22 may provide cross-sections of a triangle, a parallelogram, a square, and a hexagon 34 (FIG. 5). Other objects 20 may provide different cross-sectional views.

Figure 6:
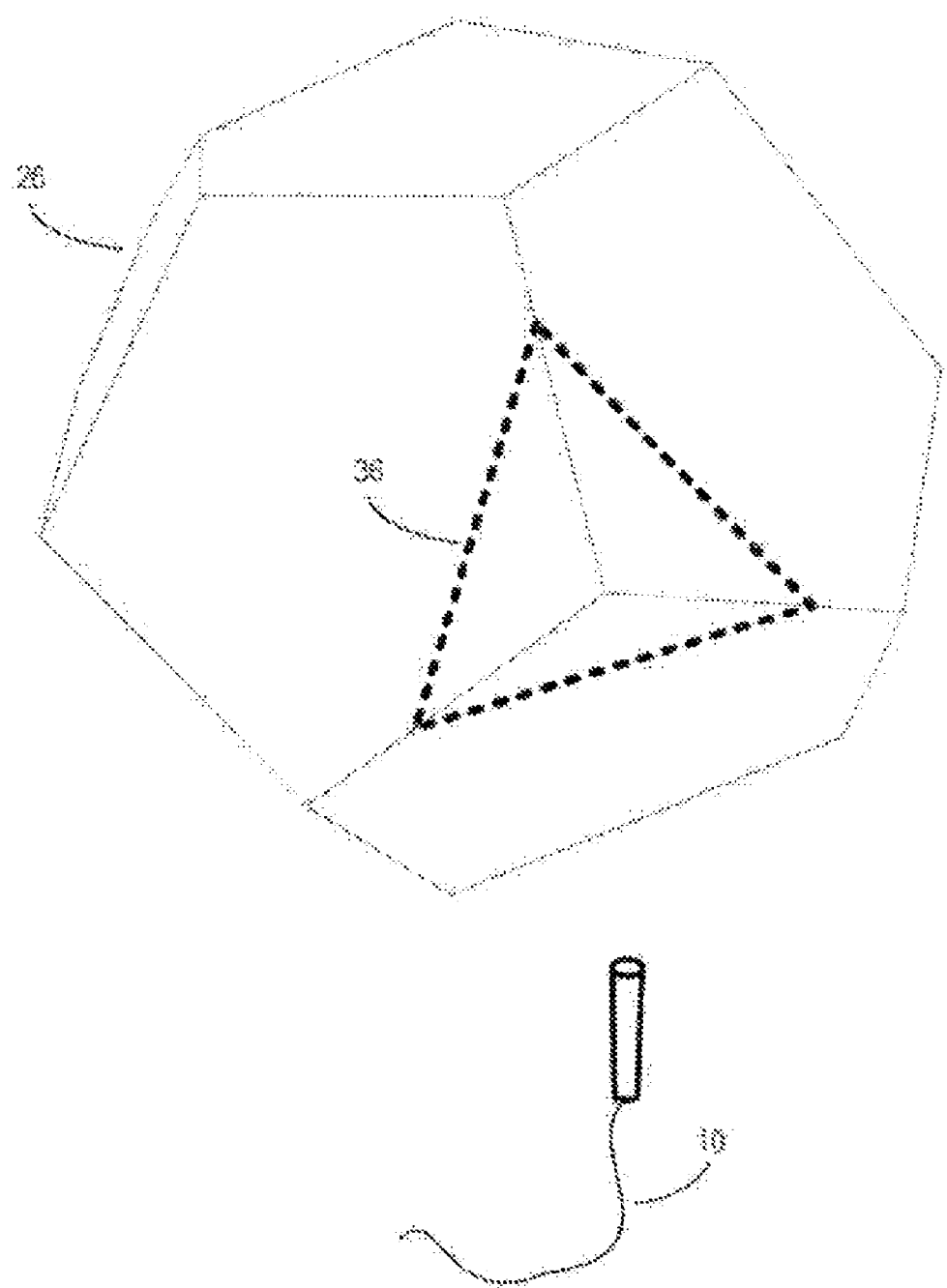
FIG. 6 illustrates a third geometric shape capable of being presented using the system of the present disclosure.
Figure 7:
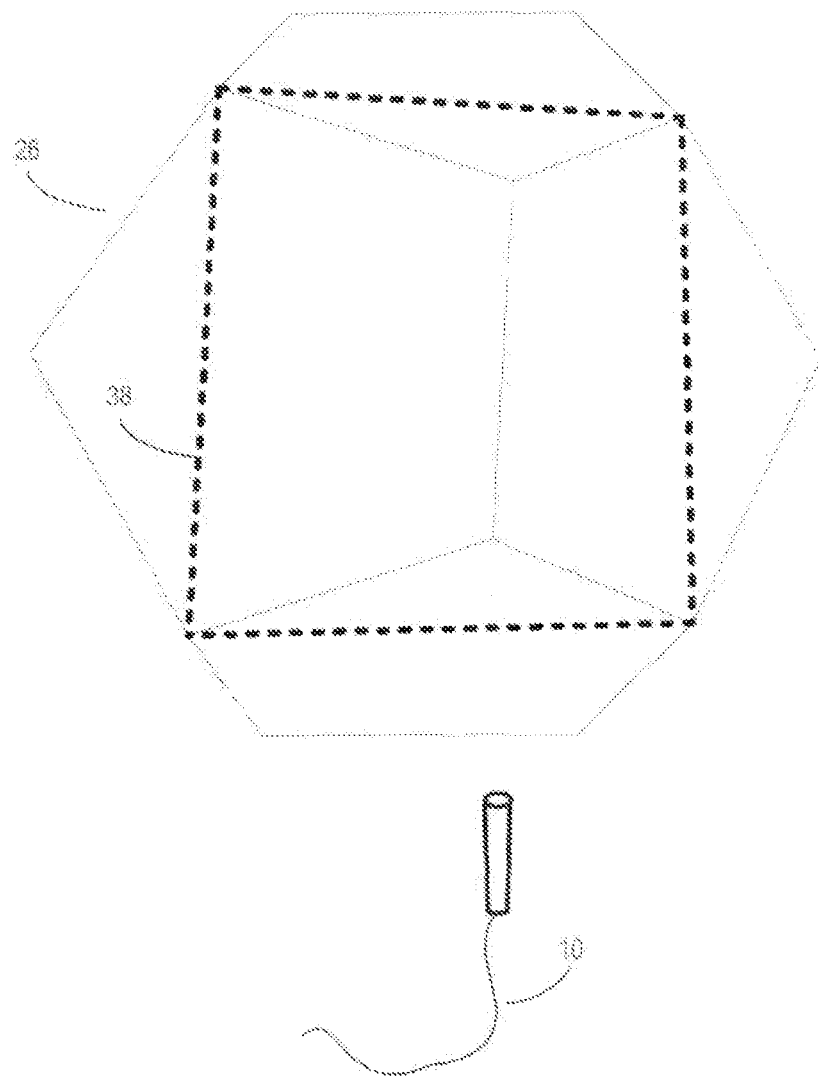
FIG. 7 illustrates a fourth geometric shape capable of being presented using the system of the present disclosure.
Figure 8:
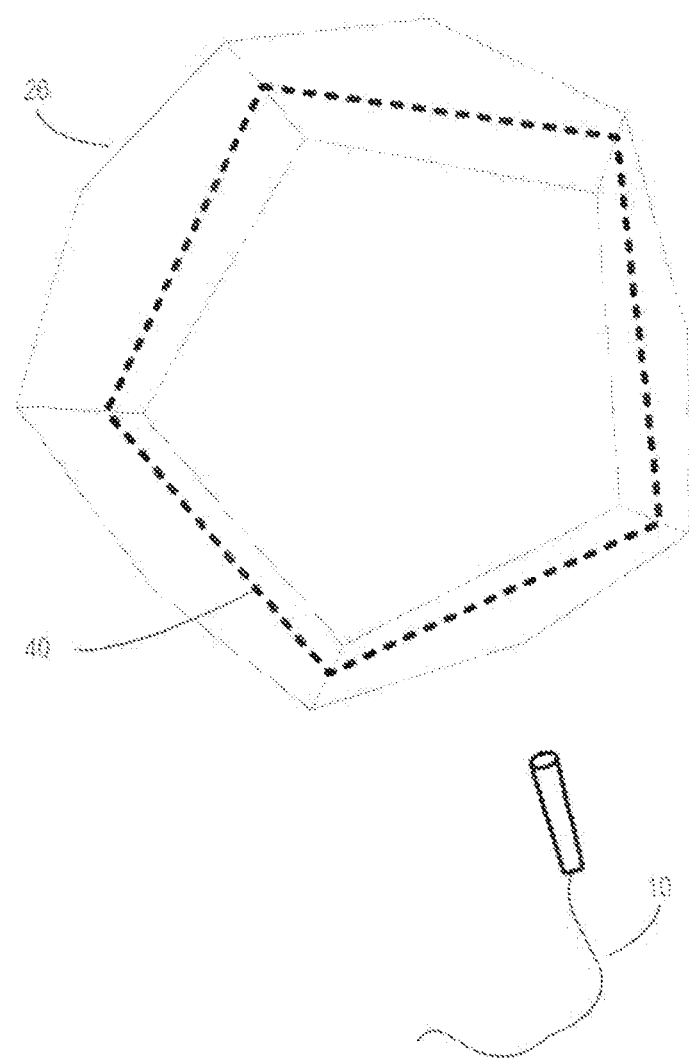
FIG. 8 illustrates a fifth geometric shape capable of being presented using the system of the present disclosure.
Figure 9:
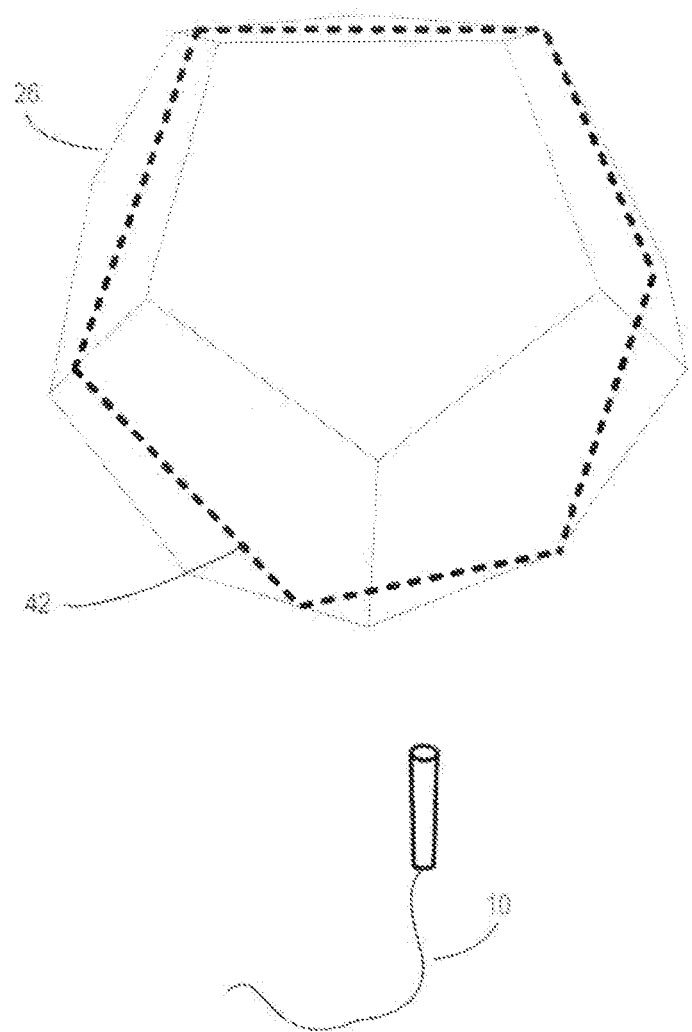
FIG. 9 illustrates a sixth geometric shape capable of being presented using the system of the present disclosure.
Figure 10:
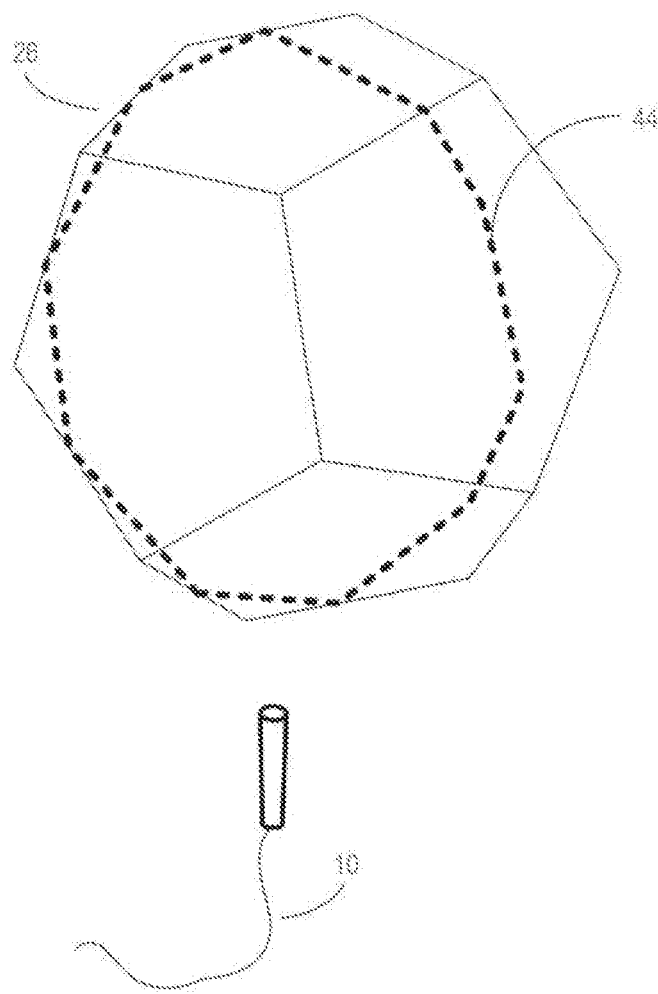
FIG. 10 illustrates a seventh geometric shape capable of being presented using the system of the present disclosure.
Figure 11:
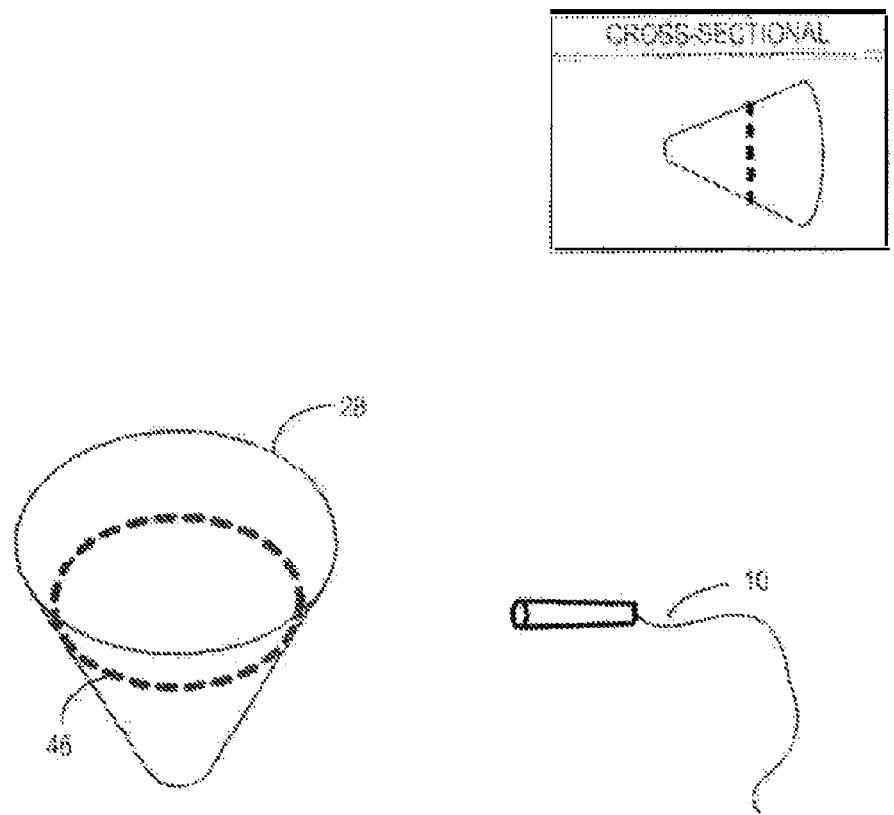
FIG. 11 illustrates an eighth geometric shape capable of being presented using the system of the present disclosure.
Figure 12:
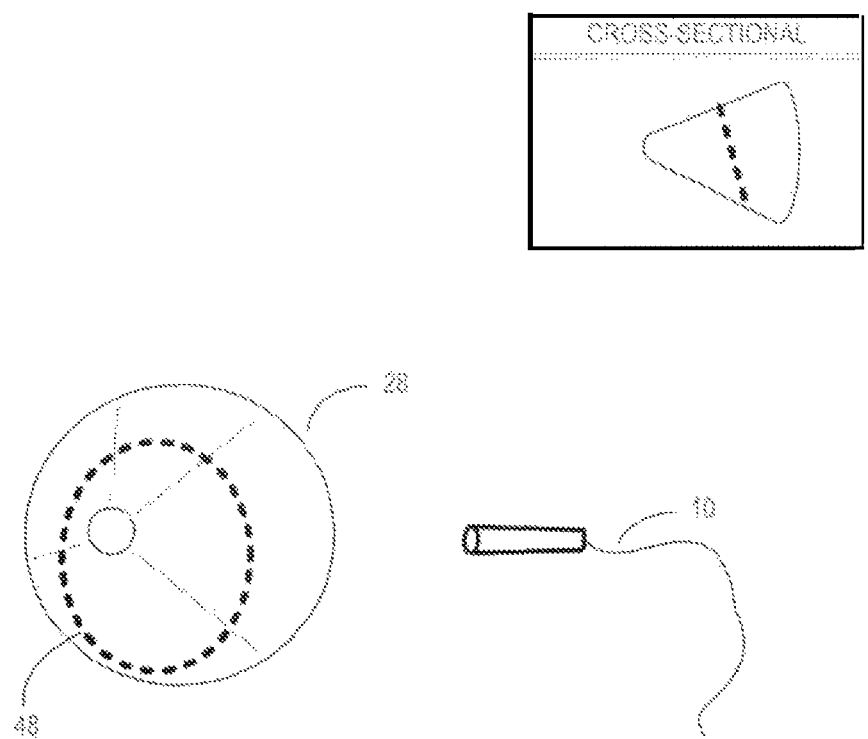
FIG. 12 illustrates a ninth geometric shape capable of being presented using the system of the present disclosure.
Figure 13:
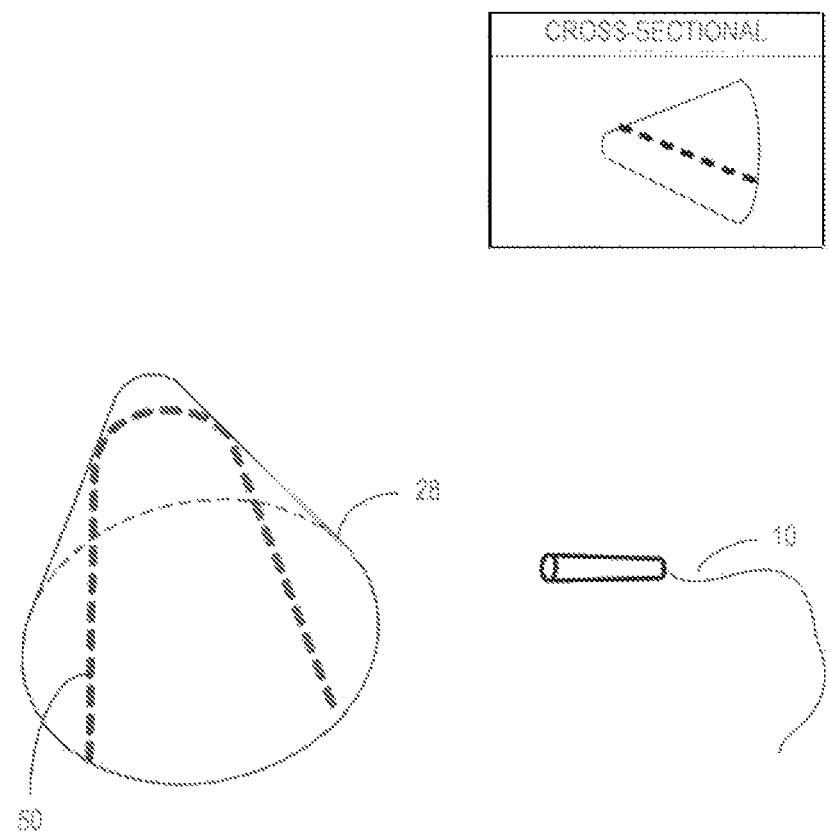
FIG. 13 illustrates a tenth geometric shape capable of being presented using the system of the present disclosure.
Figure 14:
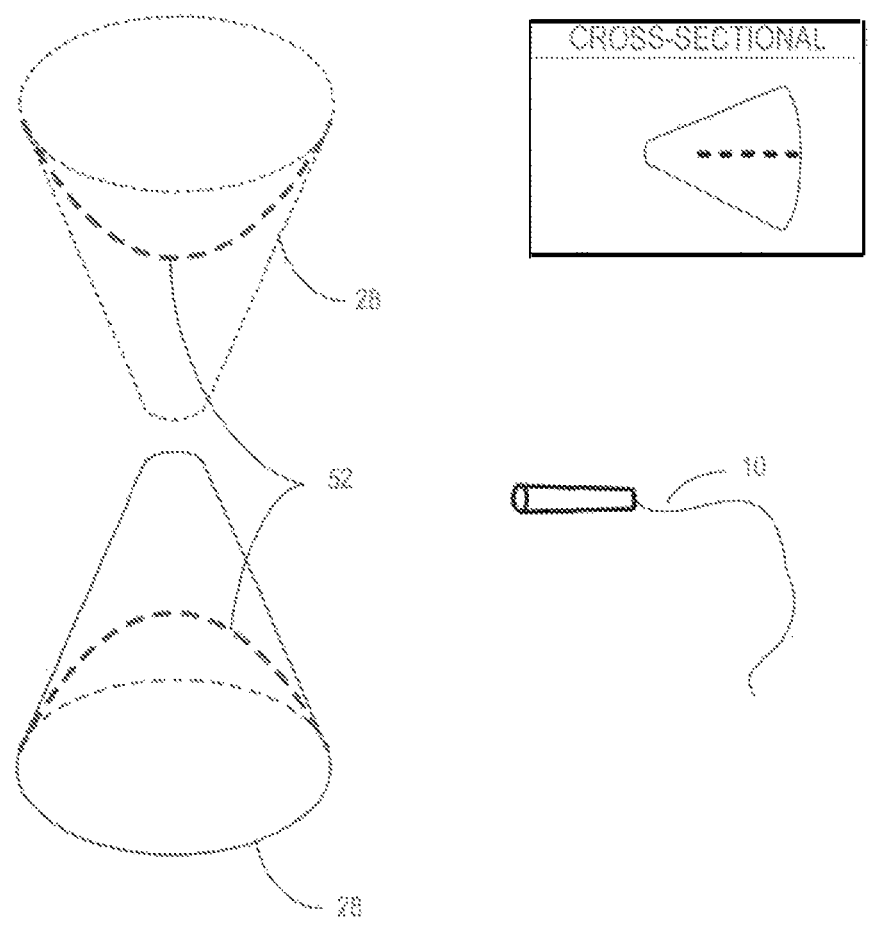
FIG. 14 illustrates an eleventh geometric shape capable of being presented using the system of the present disclosure.

Further exemplary cross-sectional views include the triangle 36 of the dodecahedron 26 (FIG. 6), the square 38 of the dodecahedron 26 (FIG. 7), the pentagon 40 of the dodecahedron 26 (FIG. 8), the hexagon 42 of the dodecahedron 26 (FIG. 9), or the decagon 44 of the dodecahedron 26 (FIG. 10). Still further exemplary cross-sectional views include the circle 46 of the cone 28 (FIG. 11), the ellipse 48 of the cone 28 (FIG. 12), the parabola 50 of the cone 28 or the hyperbola 52 of two cones 28.

Figure 15:
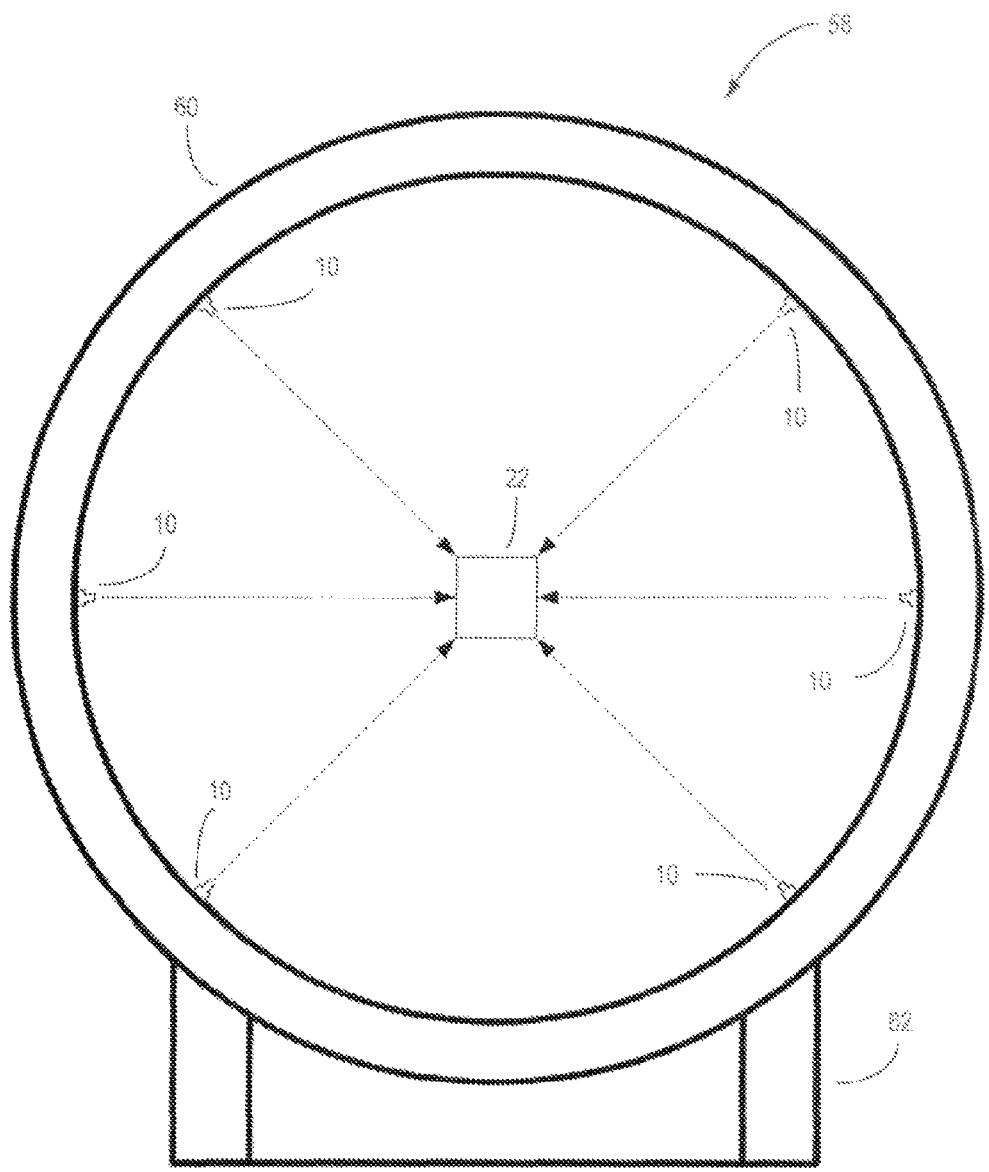
FIG. 15 illustrates an alternate embodiment of the system of the present disclosure.

In use, a single illumination device 10 may be used by a demonstrator to achieve the results illustrated herein. Alternatively, a plurality of illumination devices 10 may also be used. The benefit of a plurality of illumination devices 10 can be found in the fact that the lines illustrating the cross-section will be brighter and, if the illumination devices 10 are properly positioned, the demonstrator's hands will not interfere with the cross-sectional lines. An example of a multi-illumination device 10 system 58 can be found in FIG. 15 wherein six illumination devices 10 are positioned on a circular frame 60 that forms an annulus. The circular frame 60 is mounted on a base 62. The illumination devices 10 are spread around the interior circumference of the circular frame 60. While six illumination devices 10 are contemplated, more or fewer are within the scope of the present disclosure. In some embodiments, the base 62 may be permanently mounted or affixed to another object (e.g., to a large wooden cart with caster, allowing the device 58 to be rolled from one location to another; directly to the floor, or the like). The frame 60 and base 62 may be constructed from a variety of materials. In a particularly contemplated embodiment, the frame 60 and base 62 are made from metal or wood, with the frame 60 having an interior diameter of thirty-nine inches (99.06 cm) and an exterior diameter of forty-three inches (109.22 cm). Of course, frames of other shapes and sizes are within the scope of the present disclosure. For example, instead of a circular frame 60, a polygonal shape or irregular shapes may be used. The size may likewise be varied without departing from the scope of the present disclosure. While FIG. 15 illustrates the illumination devices 10 as being unequally spaced around the frame 60, the illumination devices 10 may be spaced equidistantly around the frame 60.

Figure 16:
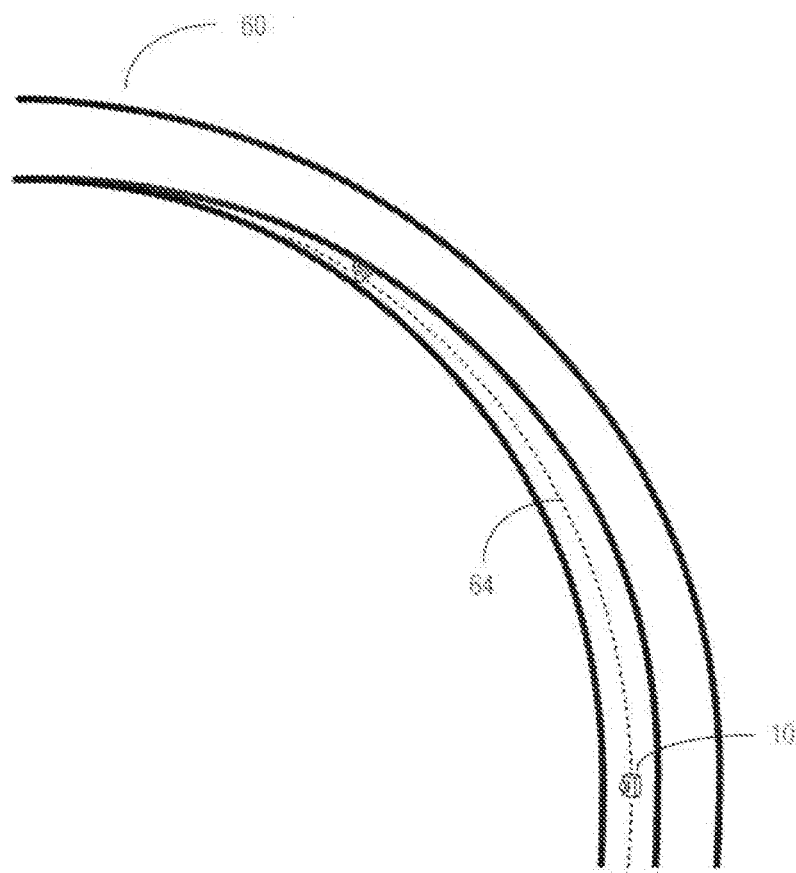
FIGS. 16 & 17 illustrate exemplary mounting techniques to hold an illumination device on a stationary frame for use with the present disclosure.

In practice, the illumination devices 10 are affixed along a surface 64 of the interior edge of the frame 60 and point toward the center of the frame 60 such that each illumination device 10 produces light along the same plane (FIG. 16).

Figure 17:
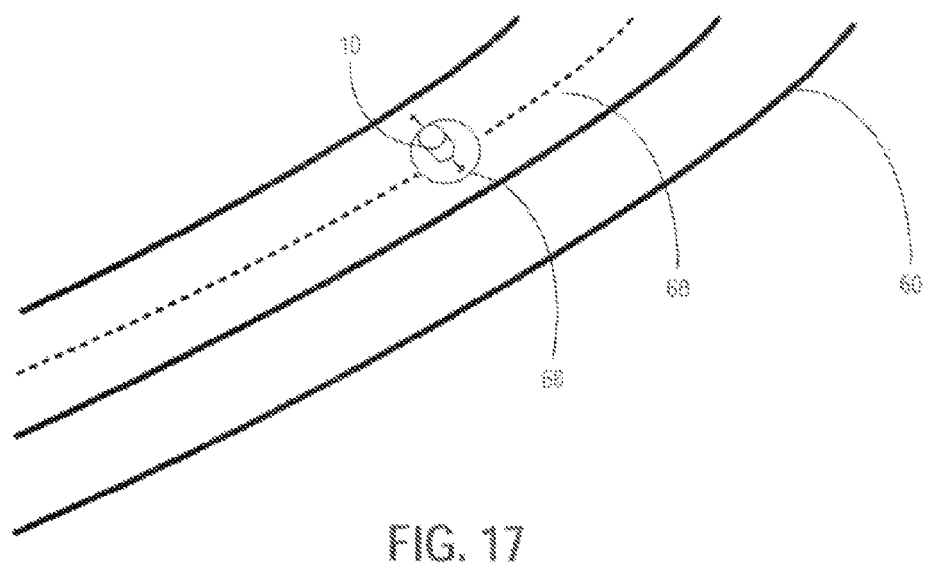

FIG. 17 illustrates an exemplary method of mounting the illumination devices 10 on the frame 60. In particular, an illumination device 10 is positioned within a circular mount 66. In one embodiment, the mount 66 may be made from rubber and inlaid into a circular hole drilled in the interior side 68 of the frame 60. After being inlaid, the rubber mount 66 would then hold the illumination device 10 in place. In an alternate embodiment, the mount 66 may comprise a plurality of set screws, allowing for adjustments to the x and y coordinates of the illumination device 10, such that the plane of light 16 of the illumination device 60 may be finely tuned so as to be co-planar with other planes of light 16 case of other illumination devices 10 mounted on the frame 60.

In essence, the interior circumference of the frame 60 encloses a single plane of light produced by the plurality of illumination devices 10. As noted above, the brightness of the plane of light increases with each additional illumination device 10. Likewise, the demonstrator's hands will not occlude all of the illumination devices 10 so that there is a greater likelihood that a desired cross-sectional view is created. With the plurality of illumination devices 10, it is possible to have multiple demonstrators operating concurrently. For example, a plurality of children may hold objects 20 within the plane of light, getting a "hands on" perspective of the experiment.

Figure 19:
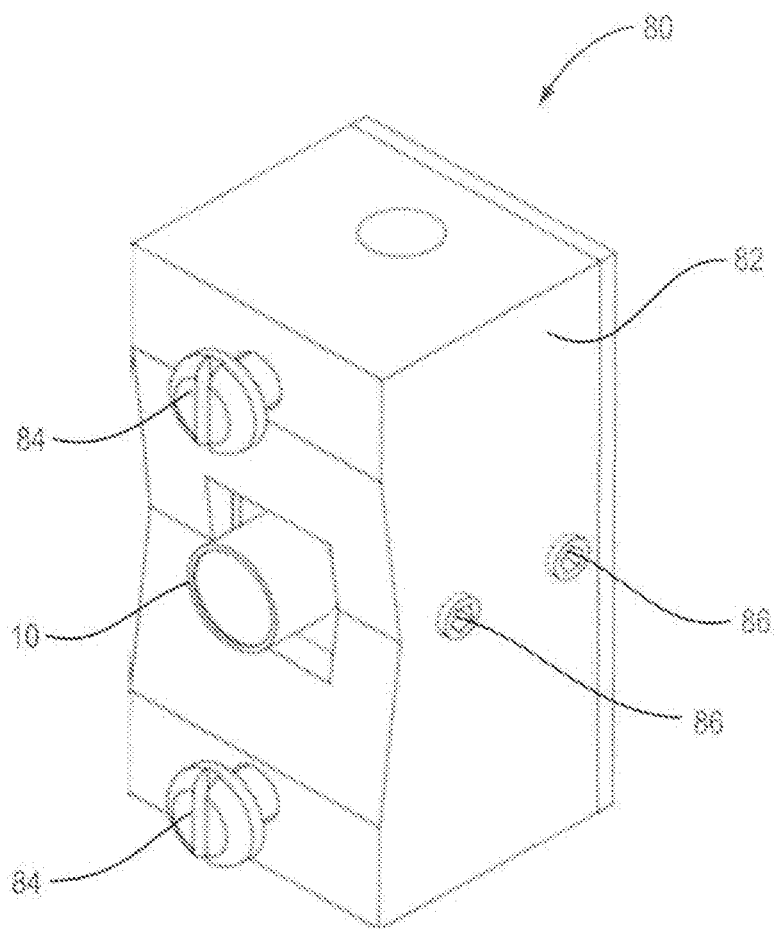
FIG. 19 illustrates an alternate mount mechanism to hold an illumination device on a stationary frame.

FIG. 19 illustrates an alternate embodiment of a mounting mechanism, specifically mount 80 is illustrated. Mount 80 may include a body 82, made from a metal (e.g., aluminum) or other rigid material. The body 82 may be approximately two inches (5.08 cm) tall, 15/16 inch (2.38 cm) deep and wide. The body is mounted to the frame 60 with fasteners 84. In an exemplary embodiment, two bolts are or screws are used. The body 82 may be mounted on the exterior surface of the frame 60, with fasteners 84 extending through the frame 60 such that the illumination device 10 is flush with the interior surface 64. Illumination device 10 may sit within the body 82 and may have its lateral position adjusted through the use of set screws 86. A compression material (not shown) may be positioned on one side of the illumination device 10 within the body 82 and opposite the set screws 86 to assist in holding the illumination device 10 in position. More set screws (not illustrated) may be used to assist in longitudinal positioning or the like. Use of the positioning set screws allows the illumination device 10 to be positioned in such a manner as to create the desired plane of light. Other mounting mechanisms are also within the scope of the present disclosure.

Figure 18:
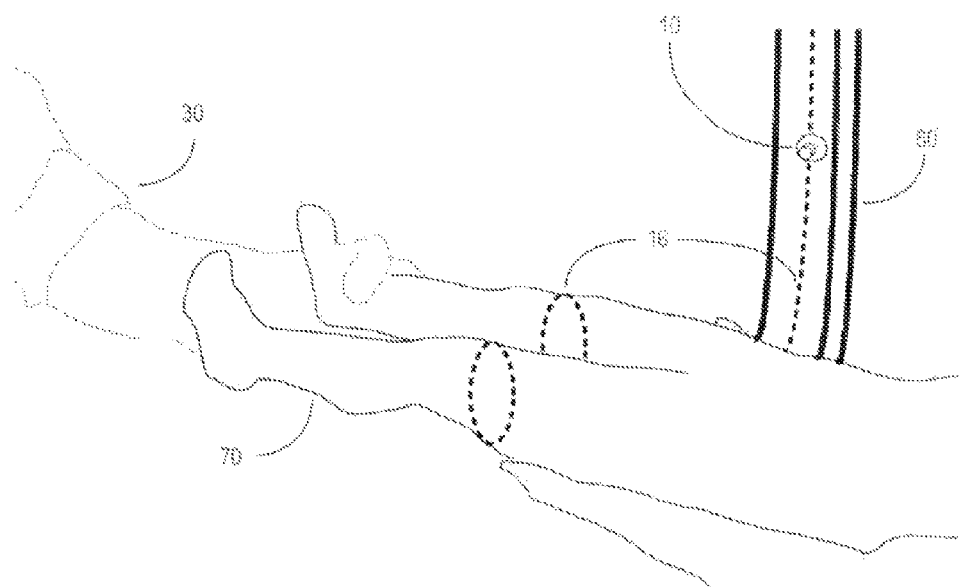
FIG. 18 illustrates an irregular shape being used with the system of the present disclosure.

While the present disclosure has focused on creating virtual cross-section of polygons, the present disclosure is not so limited. For example, as illustrated in FIG. 18, a demonstrator 30 may use an object 70 shaped like a human body. The demonstrator 30 may analogize this demonstration to an MRI or comparable medical procedure when explaining the cross-sections created by the plane of light 16 incident on the object 70.

Many of the above embodiments have focused on a demonstrator 30 holding the illumination device 10 and/or the object 20. However, in some embodiments, the illumination device 10 and/or the object 20 may be manipulated automatically (e.g., by a computer program and/or electro-mechanical devices in communication therewith). For example, in a specific embodiment of a stationary exhibit, a program stored within memory of a computer may control the illumination devices 10 held in a specific orientation relative to a fixed object 20 such that they are actuated in series, revealing different cross-sections over the course of an automated demonstration (e.g., stationary lasers positioned in different locations take turns casting planes of light through stationary objects). Alternatively, a control system using a computer program may cause a robotic arm to move an illumination device 10 through a choreographed set of movements that also cause different pre-defined cross-sections to be generated on a stationary object 20. In still another embodiment, the control system using a computer program may cause a robotic arm to move an object 20 relative to a stationary plane of light 16 to generate the different pre-defined cross-sections.

In yet another embodiment, such a device may also be manipulated manually by a demonstrator 30 (e.g., using a display screen, keyboard, mouse, joystick, and/or other devices in communication with the computer), who controls the timing and presentation and perhaps supplies oral annotations or explanations. In an automated version of the presentation, such annotations or explanations may be pre-recorded and output by audio speakers communicatively coupled to the computer. In another embodiment, multiple planes of light originating from a plurality of illumination devices 10 may pass through one or more objects 20 simultaneously, revealing aspects of visual and scientific interest (e.g., two planes of light pass through a three-dimensional object simultaneously).

Of course, other three-dimensional objects besides those shown may be used, and other two-dimensional shapes may be demonstrated. For example, in one embodiment, a three-dimensional pyramid with a square base may be used to demonstrate a square, a trapezoid, and a parallelogram. In another example, a plane of light 16 may illuminate the contour of various three dimensional object such as a hand or face.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present disclosure.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, TCP/IP, or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE INC, John Wiley & Sons, Inc. 2d ed., 1996, which is incorporated by reference in its entirety.

What is claimed is:

1. A system comprising:
   a frame forming an annulus having an inner surface;
   a plurality of illumination devices attached to the annulus and adapted to generate a plane of light within the annulus;
   a plurality of translucent regular polyhedrons sized so as to fit within the annulus such that when one of the translucent regular polyhedrons is introduced into the plane of light a virtual cross-section is created and visible to an onlooker.

2. The system of claim 1 further comprising respective mounting mechanisms that attach each of the plurality of illumination devices to the annulus.

3. The system of claim 2 wherein each respective mounting mechanism comprises a body with a plurality of set screws.

4. The system of claim 2 wherein each respective mounting mechanism comprises a rubber mount.

5. The system of claim 1 further comprising an additional translucent object comprising a model of a human body.

6. The system of claim 1 wherein at least one of the plurality of translucent regular polyhedrons comprises a cube.

7. The system of claim 1 wherein at least one of the plurality of translucent regular polyhedrons comprises a cylinder.

8. The system of claim 1 wherein at least one of the plurality of translucent regular polyhedrons comprises a cone.

9. The system of claim 1 wherein at least one of the plurality of translucent regular polyhedrons comprises a tetrahedron.

10. The system of claim 1 wherein at least one of the plurality of translucent regular polyhedrons comprises an octahedron.

11. The system of claim 1 wherein at least one of the plurality of translucent regular polyhedrons comprises a dodecahedron.

12. The system of claim 1 wherein at least one of the plurality of translucent regular polyhedrons comprises a icosahedron.

13. The system of claim 1 wherein at least one of the plurality of illumination devices comprises a red laser.

* * * * *